United States Patent
Hur et al.

(10) Patent No.: US 8,248,752 B2
(45) Date of Patent: Aug. 21, 2012

(54) MULTILAYER CERAMIC CAPACITOR

(75) Inventors: Kang Heon Hur, Gyunggi-do (KR);
Sang Hoon Kwon, Gyunggi-do (KR);
Doo Young Kim, Gyunggi-do (KR);
Eun Sang Na, Gyunggi-do (KR); Byung Gyun Kim, Gyeongsangnam-do (KR);
Seok Joon Hwang, Gyunggi-do (KR);
Kyoung Jin Jun, Gyunggi-do (KR); Hye Young Choi, Gyunggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 164 days.

(21) Appl. No.: 12/882,537

(22) Filed: Sep. 15, 2010

(65) Prior Publication Data
US 2011/0157767 A1 Jun. 30, 2011

(30) Foreign Application Priority Data
Dec. 30, 2009 (KR) .................. 10-2009-0134445

(51) Int. Cl.
*H01G 4/06* (2006.01)

(52) U.S. Cl. ............... 361/311; 361/313; 361/321.1; 361/321.2; 361/306.1; 361/306.3; 501/136; 501/137; 501/138; 501/139

(58) Field of Classification Search .................. 361/311, 361/303–305, 306.1, 306.2, 306.3, 321.1, 361/321.2, 321.4, 312–313; 501/135–139; 252/62.2
See application file for complete search history.

(56) References Cited

U.S. PATENT DOCUMENTS

| | | | |
|---|---|---|---|
| 6,442,813 B1 * | 9/2002 | Sakamoto et al. | 29/25.42 |
| 6,493,207 B2 * | 12/2002 | Nakano et al. | 361/306.3 |
| 6,556,422 B2 * | 4/2003 | Kim et al. | 361/321.2 |
| 6,606,238 B1 * | 8/2003 | Nakamura et al. | 361/321.2 |
| 7,339,780 B2 * | 3/2008 | Sridharan et al. | 361/306.1 |
| 7,589,954 B2 * | 9/2009 | Kusano et al. | 361/321.4 |
| 7,659,568 B2 | 2/2010 | Kusano et al. | |
| 2009/0097189 A1 | 4/2009 | Tasaki et al. | |

FOREIGN PATENT DOCUMENTS

| | | |
|---|---|---|
| EP | 1 035 552 A1 | 9/2000 |
| JP | 02-268411 A | 11/1990 |
| JP | 04-236412 A | 8/1992 |

(Continued)

OTHER PUBLICATIONS

Korean Office Action, with English translation, issued in Korean Patent Application No. 10-2009-0134445, mailed Apr. 21, 2011.

(Continued)

*Primary Examiner* — Nguyen T Ha

(74) *Attorney, Agent, or Firm* — McDermott Will & Emery LLP

(57) ABSTRACT

A multilayer ceramic capacitor is provided. In the multilayer ceramic capacitor, a plurality of first and second inner electrodes are formed inside a ceramic sintered body. Ends of the first and second inner electrodes are alternately exposed to both ends of the ceramic sintered body. First and second outer electrodes are formed on both ends of the ceramic sintered body and connected to the first and second inner electrodes. The first and second outer electrodes include a first region having a porosity in the range of 1% to 10%, and a second region having a porosity less than that of the first region.

5 Claims, 1 Drawing Sheet

FOREIGN PATENT DOCUMENTS

| | | |
|---|---|---|
| JP | 08-153646 | 6/1996 |
| JP | 08-162359 A | 6/1996 |
| JP | 2000-077260 | 3/2000 |
| JP | 2000-260654 A | 9/2000 |
| JP | 2001-217135 | 8/2001 |
| JP | 2002-158134 A | 5/2002 |
| JP | 2003-217969 A | 7/2003 |
| JP | 2006-186316 | 7/2006 |
| JP | 2006-245048 | 9/2006 |
| KR | 1997-0029934 | 6/1997 |
| KR | 10-2006-0085683 | 7/2006 |
| KR | 10-2007-0036794 | 4/2007 |
| KR | 10-2008-0038083 | 5/2008 |

OTHER PUBLICATIONS

Japanese Office Action, with English translation, issued in Japanese Patent Application No. 2010-196724, dated Jan. 24, 2012.

* cited by examiner

MULTILAYER CERAMIC CAPACITOR

CROSS-REFERENCE TO RELATED APPLICATIONS

This application claims the priority of Korean Patent Application No. 10-2009-0134445 filed on Dec. 30, 2009, in the Korean Intellectual Property Office, the disclosure of which is incorporated herein by reference.

BACKGROUND OF THE INVENTION

1. Field of the Invention

The present invention relates to a multilayer ceramic capacitor, and more particularly, to a multilayer ceramic capacitor which is capable of providing a high level of reliability by preventing the penetration of a plating solution and moisture.

2. Description of the Related Art

In general, ceramic electronic components, for example, a capacitor, an inductor, a piezoelectric device, a varistor, or a thermistor, include a ceramic body, an inner electrode provided inside the ceramic body, and an outer electrode provided on the ceramic body to contact the inner electrode.

As one of various ceramic electronic components, a multilayer ceramic capacitor includes a plurality of laminated dielectric layers, inner electrodes interleaved with the dielectric layers, and outer electrodes electrically connected to the inner electrodes.

Multilayer ceramic capacitors are being widely used in mobile communications devices, such as laptop computers, PDAs, mobile phones and the like, due to their small size, high capacity and ease of mounting.

Recently, as electronic products have become compact and multi-functional, chip components have also tended to become compact and multi-functional. Following this trend, a multilayer ceramic capacitor is required to be smaller than ever before while having a high capacity.

As for a general method of manufacturing a multilayer ceramic capacitor, ceramic green sheets are manufactured and a conductive paste is printed on the ceramic green sheets to thereby form inner electrode layers. Tens to hundreds of such ceramic green sheets, provided with the inner electrode layers, are then laminated to thereby produce a green ceramic laminate. Thereafter, the green ceramic laminate is pressed at a high pressure and at a high temperature and subsequently cut into green chips. Thereafter, the green chip is subjected to plasticizing, sintering and polishing processes, and outer electrodes are then formed thereupon, thereby completing a multilayer ceramic capacitor.

The multilayer ceramic capacitor is used in such a state that it is mounted on a PCB. To this end, the outer electrode may be plated with nickel or tin.

If a plating solution is penetrated into the multiplayer ceramic capacitor during the plating process, the quality of the multilayer ceramic capacitor may be thereby degraded.

SUMMARY OF THE INVENTION

An aspect of the present invention provides a multilayer ceramic capacitor which is capable of providing a high level of reliability by controlling an empty space defined in a border between an inner electrode and an outer electrode.

According to an aspect of the present invention, there is provided a multilayer ceramic capacitor including: a ceramic sintered body; a plurality of first and second inner electrodes formed inside the ceramic sintered body, ends of the first and second inner electrodes being alternately exposed to both ends of the ceramic sintered body; and first and second outer electrodes formed on both ends of the ceramic sintered body and connected to the first and second inner electrodes, the first and second outer electrodes including a first region having a porosity in the range of 1% to 10%, and a second region having a porosity less than that of the first region.

The first and second outer electrodes may include a glass frit whose content is in the range of 25 vol % to 45 vol % with respect to total composition.

The first and second outer electrodes may include at least one conductive metal selected from the group consisting of Ag and Ag alloys. The first and second inner electrodes may include at least one conductive metal selected from the group consisting of Pd and Pd alloys.

The multilayer ceramic capacitor may further include: a nickel plating layer formed on the first and second outer electrodes; and a tin plating layer formed on the nickel plating layer.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
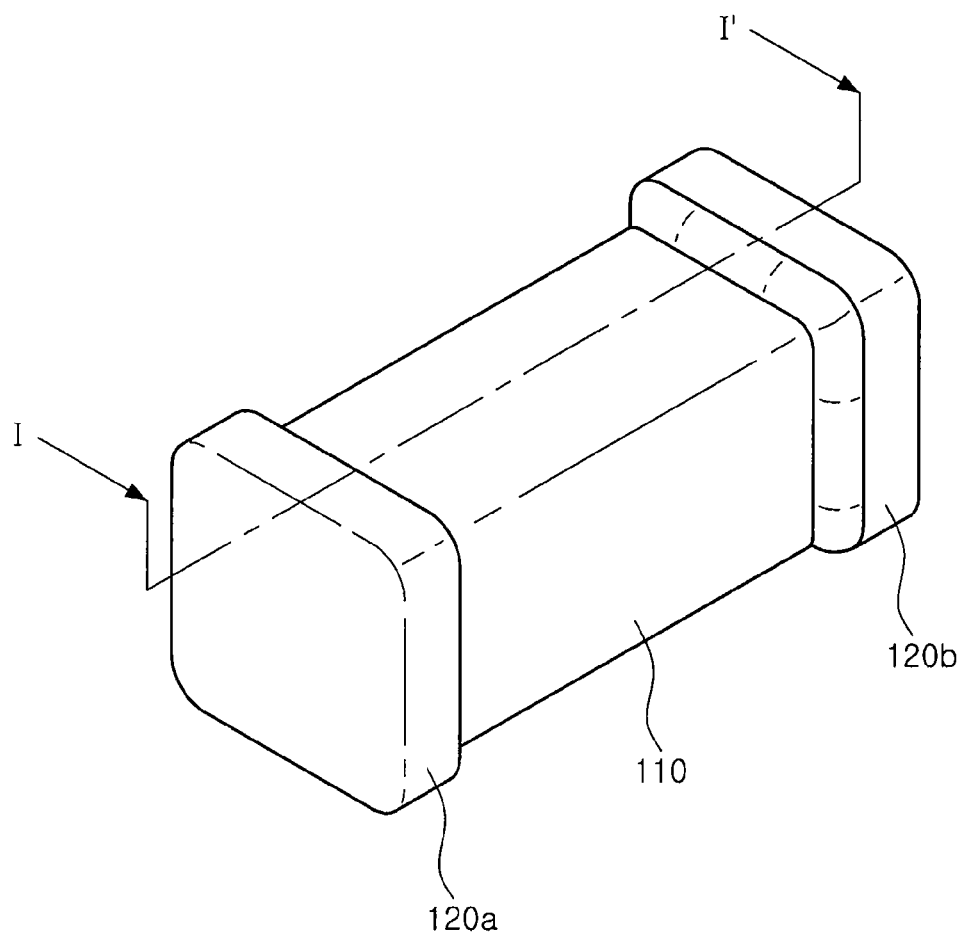
FIG. 1 is a schematic perspective view of a multilayer ceramic capacitor according to an embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the thicknesses of layers and regions are exaggerated for clarity. Like reference numerals in the drawings denote like elements, and thus their description will be omitted.

Figure 2:
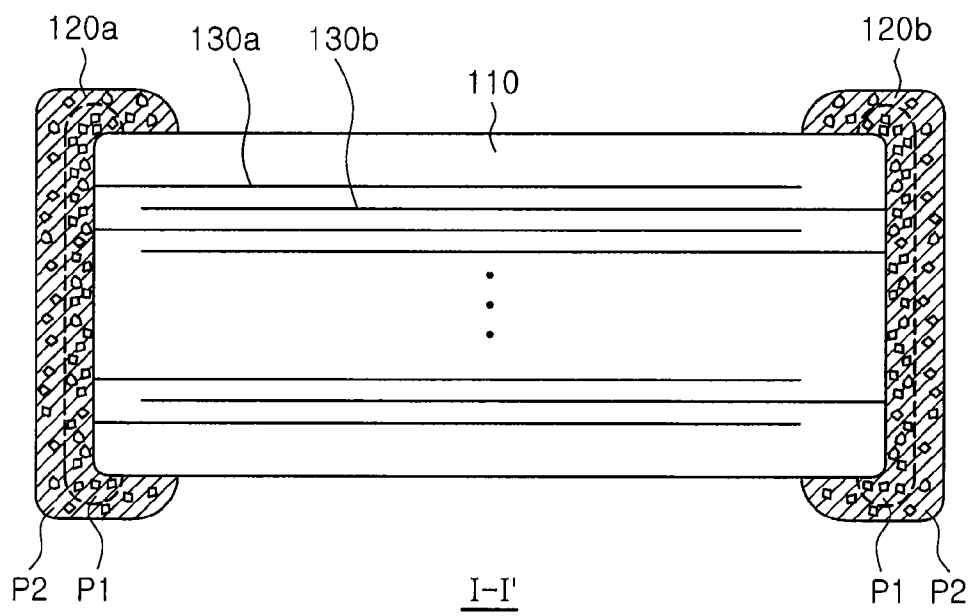
FIG. 2 is a schematic cross-sectional view taken along line I-I' of FIG. 1.

FIG. 1 is a schematic perspective view of a multilayer ceramic capacitor according to an embodiment of the present invention, and FIG. 2 is a schematic cross-sectional view taken along line I-I' of FIG. 1.

Referring to FIGS. 1 and 2, a multilayer ceramic capacitor according to an embodiment of the present invention includes a ceramic sintered body 110, first and second inner electrodes 130a and 130b provided inside the ceramic sintered body 110, and first and second outer electrodes 120a and 120b electrically connected to the first and second inner electrodes 130a and 130b.

The ceramic sintered body 110 is obtained by sintering a plurality of laminated ceramic dielectric layers. The ceramic sintered body 110 is integrally formed in such a manner that interfaces between the adjacent dielectric layers are barely distinguishable.

The ceramic dielectric layers may be formed of, but are not limited to, a ceramic material having high permittivity. For example, the ceramic dielectric layers may be formed of a barium titanate ($BaTiO_3$)-based ceramic, a lead complex perovskite-based ceramic, or a strontium titanate ($SrTiO_3$)-based ceramic.

The first and second inner electrodes 130a and 130b are interleaved with the dielectric layer during the process of laminating the plurality of dielectric layers. The first and second inner electrodes 130a and 130b are formed inside the ceramic sintered body by sintering, with the dielectric layer interposed therebetween.

The first and second inner electrodes 130a and 130b are a pair of electrodes having different polarities. The first and second inner electrodes 130a and 130b are disposed to face each other along a direction of lamination of the ceramic dielectric layers, and are electrically insulated from each other by the ceramic dielectric layers.

Ends of the first and second inner electrodes 130a and 130b are alternately and respectively exposed to both ends of the ceramic sintered body 110. The ends of the first and second inner electrodes 130a and 130b exposed to the ends of the ceramic sintered body 110 are electrically connected to the first and second outer electrodes 120a and 120b, respectively.

When a predetermined voltage is applied to the first and second outer electrodes 120a and 120b, charges are accumulated between the first and second inner electrodes 130a and 130b facing each other, and thus the static capacitance of the multilayer ceramic capacitor is proportional to areas of the first and second inner electrodes 130a and 130b facing each other.

The first and second inner electrodes 130a and 130b are formed of a conductive metal. For example, the first and second inner electrodes 130a and 130b may include one or more material selected from the group consisting of Pd and Pd alloys.

The first and second outer electrodes 120a and 120b are formed of a conductive metal. For example, the first and second outer electrodes 120a and 120b may include one or more material selected from the group consisting of Ag and Ag alloys. The first and second outer electrodes 120a and 120b have first regions P1 connected to the first and second inner electrodes 130a and 130b, and second regions P2 formed on the first regions P1.

The first regions P1 include interfaces between the first and second inner electrodes 130a and 130b and the inner electrodes 120a and 120b and have a porosity ranging from 1% to 10%. The porosity may be defined by a ratio of a total cross-sectional area of pores to a cross-sectional area of the outer electrode.

The second regions P2 are formed on the first regions P1 and have a porosity less than that of the first regions P1.

According to an embodiment of the present invention, the first and second outer electrodes 120a and 120b are formed of a conductive paste including a conductive metal, an organic binder, a glass frit, and a solvent. A content of the glass frit may be in the range of 25 vol % to 45 vol % with respect to the total composition. The conductive powder may be Ag or Ag alloys.

During a process of firing the outer electrodes 120a and 120b, Ag, which is a conductive material of the outer electrodes, is diffused toward the inner electrodes 130 and 130b. Therefore, empty spaces are formed in the interfaces between the outer electrodes 120a and 120b and the inner electrodes 130a and 130b. Moisture may penetrate through the empty spaces. Also, during a plating process, a plating solution may penetrate through the empty spaces.

The penetration of the plating solution degrades the quality of the multilayer ceramic capacitor, by degrading the electrical characteristic thereof.

Furthermore, in a case in which the interfaces between the inner electrodes 130a and 130b and the outer electrodes 120a and 120b are extremely densified, a blister failure may occur because it is difficult to discharge binder components and gas generated at a high temperature during the electrode firing process.

However, according to the embodiment of the present invention, the first regions P1 which are the interfaces between the inner electrodes 130a and 130b and the outer electrodes 120a and 120b are controlled to have the porosity in the range of 1% to 10%, and the second regions P2 have the porosity less than that of the first regions P1. Accordingly, gas and binder components are effectively discharged during the firing of the outer electrodes 120a and 120b, thereby reducing the blister occurrence rate and suppressing the penetration of moisture and a plating solution.

A nickel plating layer (not shown) may be further formed on the first and second outer electrodes 120a and 120b, and a tin plating layer (not shown) may be further formed on the nickel plating layer.

Due to the nickel plating layer and the tin plating layer, electrical connectivity to conductive lands of the PCB is enhanced. The nickel plating layer and the tin plating layer may be formed by a wet plating process such as an electrolyte plating process.

According to the current embodiment, the first and second outer electrodes 120a and 120b include the first regions P1 having the porosity in the range of 1% to 10%, and the second regions P2 having the porosity less than that of the first regions P1. The densification of the outer electrodes 120a and 120b is controlled and thus the penetration of the plating solution during the wet plating process is suppressed, thereby preventing degradation in the reliability of the multilayer ceramic capacitor.

Hereinafter, a method of manufacturing a multilayer ceramic capacitor according to an embodiment of the present invention will be described.

First, a plurality of ceramic green sheets are prepared. Specifically, a slurry is formed by mixing a ceramic powder, a binder, and a solvent, and the slurry is made into a sheet having a thickness of several μm by a doctor blade method.

Then, first and second electrode patterns are formed by coating a paste for an inner electrode on the ceramic green sheets. The first and second inner electrode patterns may be formed by a screen printing process. The paste for an inner electrode may be formed by dispersing a Pd or Pd alloy powder into an organic binder and an organic solvent.

The organic binder may be a binder known in the art to which the invention pertains. For example, the organic binder used may be, but is not limited to, a cellulose-based resin, an epoxy resin, an aryl resin, an acryl resin, a phenol-formaldehyde resin, an unsaturated polyester resin, a polycarbonate resin, a polyamide resin, a polyimide resin, an alkyd resin, or a rosin ester.

Furthermore, the organic solvent may also be an organic solvent known in the art to which the invention pertains. For example, the organic solvent may use, but is not limited to, butyl carbitol, butyl carbitol acetate, turpentine oil, α-terebineol, ethyl cellosolve, or butyl phthalate.

Then, the ceramic green sheets in which the first and second inner electrode patterns are formed are laminated and pressed in a direction of lamination to thereby attach the laminated ceramic green sheets to the paste for an inner electrode. In this way, a ceramic laminate in which the ceramic green sheets and the paste for an inner electrode are alternately laminated is manufactured.

Next, the ceramic laminate is cut to form a chip in each region corresponding to a unit capacitor. In this case, the ceramic laminate is cut such that ends of the first and second inner electrode patterns are alternately and respectively exposed to the ends of the chip. Then, a ceramic sintered body is manufactured by firing the ceramic laminate chips at a temperature of 1,200° C.

Afterwards, first and second outer electrodes are formed by coating and firing a paste for an outer electrode so that they cover the ends of the ceramic sintered body and are electrically connected to the first and second inner electrodes which are exposed to the ends of the ceramic sintered body.

The paste for the first and second external electrodes 120a and 120b is formed by mixing a conductive metal, an organic binder, an organic frit, and a solvent.

The first and second outer electrodes 120a and 120b are formed by sintering a slurry in which the conductive metal, the organic binder, the organic frit, and the solvent are mixed. A content of the organic frit is in the range of 25 vol % to 45 volt % with respect to the total composition.

Ag or Ag alloys may be used as the conductive metal. In addition, the firing of the paste for the outer electrodes 120a and 120b may be performed at a temperature ranging from 600° C. to 900° C. After firing the paste for the outer electrodes 120a and 120b, the outer electrodes 120a and 120b are connected to the first and second inner electrodes 130a and 130b and include the first regions having the porosity of 1-10%, and the second regions P2 formed on the first regions P1 and having the porosity less than that of the first regions P1.

A nickel plating layer (not shown) and a tin plating layer (not shown) may be formed on the first and second outer electrodes 120a and 120b by a wet plating process such as an electrolyte plating process.

Table 1 below shows the results of DF evaluation before and after the plating of the multilayer ceramic capacitor manufactured under the conditions of Table 1.

TABLE 1

|  | Porosity of the first region (%) | DF evaluation before plating (number of DF failures/number of samples) | DF evaluation after plating (number of DF failures/number of samples) |
| --- | --- | --- | --- |
| Embodiment 1 | 1 | 0/500 | 0/500 |
| Embodiment 2 | 3 | 0/500 | 0/500 |
| Embodiment 3 | 5 | 0/500 | 0/500 |
| Embodiment 4 | 10 | 0/500 | 0/500 |
| Comp. example 1 | 0 | 7/500 | 6/500 |
| Comp. example 2 | 12 | 0/500 | 2/500 |
| Comp. example 3 | 15 | 0/500 | 21/500 |
| Comp. example 4 | 20 | 0/500 | 212/500 |

Referring to Table 1 above, the embodiments 1 to 4 in which the first region of the outer electrode has the porosity in the range of 1 to 10% obtain the same DF evaluation results before and after the plating process. Thus, it can be seen that the penetration of the plating solution is prevented. On the contrary, the comparative examples 1 to 4 have the porosity out of the range of 1% to 10%. Thus, it can be seen from the DF evaluation results before and after the plating process that the penetration of the plating solution occurs.

According to the embodiments of the present invention, the multilayer ceramic capacitor includes the second outer electrodes connected to the first and second inner electrodes and having the first region having the porosity of 1-10% and the second region formed on the first region and having the porosity less than that of the first region.

According to the embodiments of the present invention, the first region P1 which is the interface between the inner electrode and the outer electrode is controlled to have the porosity in the range of 1% to 10%, and the second region P2 has the porosity less than that of the first region P1. Accordingly, gas and binder components are effectively discharged during the firing of the outer electrodes, thereby reducing the blister occurrence rate.

The penetration of the plating solution during the plating process on the first and second outer electrodes is suppressed, thereby preventing degradation in the reliability of the multilayer ceramic capacitor.

While the present invention has been shown and described in connection with the exemplary embodiments, it will be apparent to those skilled in the art that modifications and variations can be made without departing from the spirit and scope of the invention as defined by the appended claims.

What is claimed is:

1. A multilayer ceramic capacitor comprising:
a ceramic sintered body;
a plurality of first and second inner electrodes formed inside the ceramic sintered body, ends of the first and second inner electrodes being alternately exposed to both ends of the ceramic sintered body; and
first and second outer electrodes formed on both ends of the ceramic sintered body and connected to the first and second inner electrodes, the first and second outer electrodes including a first region having a porosity in the range of 1% to 10%, and a second region having a porosity less than that of the first region.

2. The multilayer ceramic capacitor of claim 1, wherein the first and second outer electrodes comprise a glass frit whose content is in the range of 25 vol % to 45 vol % with respect to total composition.

3. The multilayer ceramic capacitor of claim 1, wherein the first and second outer electrodes comprise at least one conductive metal selected from the group consisting of Ag and Ag alloys.

4. The multilayer ceramic capacitor of claim 1, wherein the first and second inner electrodes comprise at least one conductive metal selected from the group consisting of Pd and Pd alloys.

5. The multilayer ceramic capacitor of claim 1, further comprising:
a nickel plating layer formed on the first and second outer electrodes; and
a tin plating layer formed on the nickel plating layer.

* * * * *